Patented Apr. 14, 1931

1,800,860

UNITED STATES PATENT OFFICE

HANS T. CLARKE AND CARL J. MALM, OF ROCHESTER, NEW YORK, ASSIGNORS TO EASTMAN KODAK COMPANY, OF ROCHESTER, NEW YORK, A CORPORATION OF NEW YORK

PROCESS OF MAKING ORGANIC ESTERS OF CELLULOSE CONTAINING ACYL GROUPS HAVING MORE THAN TWO CARBON ATOMS

No Drawing.    Application filed March 28, 1927. Serial No. 179,176.

This invention relates to processes of making organic esters of cellulose which contain one or more acyl groups having more than two carbon atoms. It relates to the making of unmixed esters in which the acyl groups are all alike, and to the mixed esters in which there are two or more different acyl groups. One object of the invention is to provide processes of wide applicability, whereby cellulose esters containing many different kinds of acyl groups, even those of very high molecular weight, may be easily prepared. Another object is to provide such processes in which the higher acyl groups in the esters are derived from the corresponding higher acids in the reaction mixture without the trouble and expense of specially preparing and mixing the corresponding higher anhydrides or acyl chlorides into the reaction bath. A further object is to provide a process in which, as a main initial ingredient, there is an organic anhydride substance, which anhydride has the generic advantage of impelling the entrance into the ester of acyl groups from the higher organic acids,—in other words, the anhydride substance impels esterification by acids containing more carbon atoms than the acid to which it corresponds. In one species of our invention, the anhydride itself contributes groups to mixed organic esters, in another species the anhydride impels esterification without itself contributing any acyl groups to the ester.

Still another object is to provide processes of making mixed cellulose esters in which the acyl groups of higher and lower molecular weights are simultaneously introduced into the ester during a single reaction step, instead of successively by a troublesome and expensive plurality of separate esterifications. Another object is to provide processes which will esterify, not only easily esterified cellulosic bodies, such as hydrocellulose and reverted cellulose, but can also and preferably utilize substantially undegraded cellulose, such as cotton, surgical cotton wool, tissue paper from cotton stock, and even sulfite wood pulp, thereby producing cellulose esters of higher quality, as evidenced by the films produced therefrom. Another object of the invention is to provide relatively simple processes which will be rapid, easily controlled, and economical and will fully esterify the cellulose material. Another object is to provide processes in which the ingredients form a liquid active esterifying bath at temperatures which permit the reaction to be carried out successfully and yet do not substantially impair the cellulose or the cellulose esters produced therefrom. Other objects will hereinafter appear.

The broadest aspect of our invention is the esterification of cellulosic material with higher acyl groups by the use of the corresponding higher acids themselves without the need of previously preparing their anhydrides or higher acyl chlorids. So far as we are aware, we are the first to thus utilize such higher acids directly for cellulose esterification under the esterification-impelling influence of an organic anhydride substance, such as the lower fatty acid anhydrides hereinafter described or their substituted derivatives as described in our copending application of even date herewith for "process of making cellulose esters of organic acids" Serial No. 179,177. The genus of our invention is claimed in the present application together with the species of our invention in which the esterification by the higher acids is impelled by lower anhydrides which also contribute acyl groups to the esters. That species of our invention in which esterification by the higher acids is impelled by anhydrides (such as substituted anhydrides) which do not contribute any acyl groups to the esters, is claimed in said application Serial No. 179,177.

We prepare mixed organic esters of cellulose by subjecting the cellulose material to the co-action of an organic acid which supplies relatively higher acyl groups to the ester and an organic acid anhydride which supplies relatively lower acyl groups to the ester and at the same time impels the entrance of said relatively higher acyl groups into the ester. The organic acids which we can employ for furnishing the relatively higher acyl groups can be selected from the group which consists of the unsubstituted aliphatic monocarboxylic acids including the cycloparaffinic, the aromatic monocarboxylic acids and the aralkyl monocarboxylic acids. Typical anhydrides which can be used in our process to contribute the lower acyl groups, and at the same time impel esterification from the higher acids in the bath, include the lower fatty acid anhydrides containing less than 10 carbon atoms. In fact, we prefer to use the member of this group having the lowest molecular weight,—namely acetic anhydride, this being the most powerful and the least expensive.

The higher acids are difficult to keep in solution in the esterifying baths. Consequently, in the preferred embodiment of our invention we have present a powerful solvent for both the anhydride and higher acid, as well as the ester which is produced. Likewise this solvent should preferably be one which does not complicate the reaction by furnishing any acyl groups to the ester. We prefer to use monochlor acetic acid for this purpose, but the di and trichlor acetic acids are also useful, either alone or mixed with monochlor acetic acid. Mono, di and tri brom acetic acids, or mixtures of them can also be utilized, but are too expensive. We have found it desirable to have such an active solvent present when dealing with organic acids having more than three carbon atoms. None of those mentioned contribute any acyl groups to the ester under the conditions existing in our processes.

The time of the process is shortened and the results are more advantageous when a catalyst is used. We have carefully proven that the halogenated acetic acids, mentioned in the preceding paragraph, do not have any useful catalytic effect when they are pure. Impure commercial samples often contain impurities which do have a certain catalytic effect. This accounts for the statement of earlier observers that the halogenated acetic acids act catalytically. Since the amount of these impurities is a matter of chance, we prefer to use halogenated acetic acids, which are substantially free from them, and then introduce a definite known amount of a reliable catalyst, such as any of the perchlorates disclosed in the application of Carl J. Malm, Serial No. 137,385, filed September 23rd, 1926, for process of making cellulose esters of organic acids. Any other mild catalyst, such as zinc chlorid is satisfactory, but we prefer to use magnesium perchlorate.

The red phosphorus and chlorine catalyst of U. S. Patent No. 1,591,590, Webb and Malm, July 6th, 1926, is a further illustration of an available material.

Our process is carried out at temperatures above the melting point of the mixed ingredients of the esterifying bath, but below temperatures at which the cellulose, or the mixed esters made from it are degraded. Such degradation is indicated by brittleness of films prepared from the esters. It should be noted that the mixture in the bath melts at a much lower point than some of the higher acids, when tested alone. Halogenated acetic acids are of particular aid in producing this result, monochloracetic acid, for instance, being an especially strong solvent of such soluble materials as stearic acid. While the general range of available temperatures is that outlined above, we find it especially convenient to work within the range from 50° C. to 80° C. according to the particular acids, catalysts, or anhydrids employed. It is an advantage of our processes, as will be evident from the examples hereinafter given, that they operate in a comparatively short time, without degradation of the product, at such a relatively mild temperature as 60° to 65° C. when monochloracetic acid and magnesium perchlorate are employed.

As a source of cellulosic material, we may utilize any of those customarily employed in making esters, such as cotton fiber tissue paper, clean cotton, surgical cotton wool (preferably bleached), and even carefully prepared sulfite wood pulp which has been bleached. These materials, especially the cotton materials, are undegraded when they enter our process and can yield esters which are likewise substantially unimpaired or undegraded, as evidenced by the flexibility of of films prepared from them. Of course, our process will operate upon such easily esterified materials as so-called hydrocellulose, reverted cellulose, such as may be derived from the viscose or cuprammonium process and even the low cellulose nitrates, actetates, or formates, or ethers, which still contains a useful number of esterifiable hydroxyls.

We shall now give numerous examples of our process by way of illustration, but it will be understood that our invention is not limited to the details here given except as indicated in the appended claims. It will be noted that in every instance the esterifying acid in the bath is of a higher molecular weight than the acid corresponding to the anhydrid. For example, when acetic anhydrid is used, the esterifying acid has three or more carbon atoms, when a propionic anhydrid is used the esterifying acid has four or more carbon atoms, and so on.

One of the simplest illustrations is the following:

An esterifying bath is prepared comprising 20 parts by weight of propionic acid, 15 parts by weight of acetic anhydrid, and 5 parts by weight of glacial acetic acid. There is also thoroughly incorporated into this bath one part by weight of fused zinc chlorid as a catalyst. 5 parts by weight of purified cotton are thoroughly mixed into this bath and the latter maintained at 60° to 65° C. until a clear mixture or dope results. This generally takes place in 35 hours or less. The resulting ester is isolated by pouring into water, washing and drying, as is customary in making unmixed cellulose esters. The product contains not only acetyl groups, but enough propionyl groups to make the product soluble in acetone, in methyl acetate, and in chloroform.

For convenience we have arranged the following examples in tabular form. In each examples in tabular form. In each example in this table 15 parts by weight of the relatively higher acid indicated in the first column is dissolved in the parts by weight of monochloracetic acid noted in the second column along with 15 parts by weight of acetic anhydrid and .05 parts by weight of magnesium perchlorate trihydrate. Into this bath there is mixed thoroughly 5 parts by weight of cotton tissue paper and the reaction mixture maintained at 60° to 65° C. for about the length of time indicated in the third column. In each case the fibers of the paper disappear and a homogeneous clear dope results. Full esterification of the cellulose then has taken place, there being approximately 3 acyl groups for each 6 carbon atoms in the cellulose, or substantially 12 acyl groups for each 24 carbon atoms in the cellulose, according to which basis is taken for computation This is poured into a suitable precipitating liquid and the product washed and dried. When the higher fatty acids are present, we prefer to use methyl alcohol as the precipitating bath and to wash the precipitate with warm methyl alcohol:

| Name of the higher acid | Parts of monochloracetic acid by weight | Approximate time for full esterification |
|---|---|---|
| | | Hours |
| Propionic | 15 | 3 |
| n-butyric | 15 | 4 |
| Iso-butyric | 15 | 4 |
| n-valeric | 15 | 5 |
| Iso-valeric | 15 | 5 |
| n-heptylic | 15 | 3 |
| Lauric | 15 | 3 |
| Myristic | 15 | 4 |
| Palmitic | 25 | 6 |
| Stearic (commercial) | 25 | 24 |
| Cyclohexanecarboxylic | 15 | 48 |
| Crotonic | 15 | 6 |
| Cinnamic | 25 | 2 |
| Hydrocinnamic | 15 | 3 |
| Undecylenic | 25 | 6 |
| o-methoxybenzoic | 15 | 6 |
| Benzoic | 25 | 2 |

In each of the examples given in the table, except the last one, the product is soluble completely in either acetone or chloroform or mixtures of them. In the case of the acetobenzoate produced in the last example of the table, the product is soluble in chloroform but not in acetone. In each mixed ester produced in the above table, there is present sufficient of the acyl groups corresponding to the higher acids to modify the solubilities of said product. For example, cellulose triacetate, before hydrolysis to acetone solubility, is normally soluble in chloroform, but not acetone, and cellulose tripalmitate or tristearate is normally insoluble in acetone but soluble in chloroform or benzol. Yet the mixed ester produced with commercial stearic acid in the above table is soluble in both acetone and chloroform, and is insoluble in benzol. It will be noted that the proportions given in the above examples may be varied considerably over a rather wide range.

In another example of our invention, 25 parts by weight of commercial stearic acid (containing about equal quantities of stearic and palmitic acids) are mixed with 15 parts by weight of acetic anhydrid, 40 parts by weight of chloracetic acid and .05 parts by weight of magnesium perchlorate. Into this mixture 5 parts by weight of bleached cotton tissue paper are thoroughly mixed and the reaction carried out at 60° to 65° C. until a clear dope results, usually after about 5 hours. The product is isolated by pouring into methyl alcohol and washing with warm methyl alcohol. It is acetone-soluble and about 7% of its weight is due to the higher acyl groups in it,—namely, stearyl and palmityl. It is an aceto-palmito-stearate of cellulose.

Analogous results can be obtained by using propionic anhydrid along with acids of higher molecular weight than propionic acid. For example, 15 parts by weight of propionic anhydrid are mixed with 15 parts by weight of lauric acid, 15 parts by weight of chloracetic acid, and .05 parts by weight of magnesium perchlorate. 3 parts by weight of bleached cotton tissue are thoroughly mixed into this mass and the reaction conducted at approximately 60° to 65° C. until a clear dope is formed, usually in 6 hours. The product is precipitated and washed in the way above described. The product is soluble in chloroform or acetone and is suitable for a varnish on relatively rigid surfaces. It is cellulose propiono-laurate.

In another example, 20 parts by weight of propionic anhydrid are mixed with 15 parts by weight of commercial stearic acid, 40 parts by weight of chloracetic acid and .05 parts by weight of magnesium perchlorate. Into this mixture 5 grams of cotton tissue paper are thoroughly mixed and the reaction carried out at 60° to 65° C. until a clear mass is obtained, say about 20 hours. The product is isolated and purified by means of methyl alcohol. The propiono-palmito-stearate thus obtained is soluble in chloroform or acetone. About 14% of its weight is due to the stearyl and palmityl groups in it.

In still another form of our invention butyric anhydrid is employed. 25 parts by weight of this substance are mixed with 30 parts by weight of chloracetic acid and 20 parts by weight of orthomethoxybenzoic acid and .05 parts by weight of magnesium perchlorate. 5 parts by weight of purified cotton or tissue paper is thoroughly mixed into this mass and the reaction carried out at 60° to 65° C. until a clear dope results, usually in about 48 hours. The product is isolated and washed by means of methyl alcohol in the way indicated above. The product is soluble in chloroform, acetone, and/or benzol and upon analysis shows presence of 5.7% of methoxyl. It is cellulose aceto-methoxylbenzoate.

Our method may be utilized for obtaining cellulose mixed esters in fibrous form as distinct from precipitated products. For instance, 100 parts by weight of propionic acid containing .1 part by weight of perchloric acid are thoroughly mixed into 10 parts by weight of cotton fibers, and the excess squeezed out by pressure until 55 parts by weight of propionic acid is left in contact with the cotton fibers. The latter are then thoroughly mixed into 320 parts of carbon tetrachlorid and 40 parts by weight of acetic anhydrid. The reaction mixture is then allowed to stand at room temperature until a sample is found to be soluble in acetone. The premixing with the propionic acid, occupies only a very short interval of time,—just long enough to get each fiber intimately wetted with the acid. No activation of the cotton is produced in this brief interval.

As indicated more in detail in our above mentioned copending application, Serial No. 179,177, esterification of cellulosic material by the acids listed in the first column hereinabove can be effected under impulsion from halogenated or methoxylated lower fatty acid anhydrids, such as monochloracetic anhydrid or methoxyacetic anhydrid. The temperatures, catalysts, and operations are practically the same as those given in the examples and table hereinabove, except that 15 to 30 parts by weight of each higher acid is taken, and 30 to 60 parts by weight of the substituted anhydrid, say monochloracetic anhydrid, is used in place of acetic anhydrid, the reaction being always carried to the point where a homogeneous reaction mass or "dope" is obtained. Mixed esters can be obtained in such process by using mixed acids, say 30 parts by weight of stearic acid (commercial) and 6 parts by weight of glacial acetic acid. The substituted anhydrids do not contribute groups to the esters, but are very powerful impellers of esterification by the acids.

Having thus described our invention, what we claim as new and desire to secure by Letters Patent is:

1. The process of making organic esters of cellulose which comprises treating cellulosic material with at least an equal amount of an acid which contains an acyl group and which is selected from the group which consists of the unsubstituted aliphatic monocarboxylic acids including the cycloparaffinic, the aromatic monocarboxylic acids, and the aralkyl monocarboxylic acids, and an organic anhydride substance which impels the esterification of said cellulosic material by acyl groups from said acid, said acid containing more carbon atoms than the acid corresponding to said organic anhydride substance.

2. The process of making organic esters of cellulose which comprises treating cellulosic material with at least an equal amount of an unsubstituted fatty acid having more than two carbon atoms and an organic anhydride substance which impels the esterification of said cellulosic material by acyl groups from said fatty acid, said fatty acid containing more carbon atoms than the acid corresponding to said organic anhydride substance.

3. The process of making organic esters of cellulose which comprises treating cellulosic material with at least an equal amount of an acid selected from the group which consists of lauric, myristic, palmitic and stearic acids, and an organic anhydride substance which impels the esterification of said cellulosic material by acyl groups from said acid, said acid containing more carbon atoms than the acid corresponding to said organic anhydride substance.

4. The process of making organic esters of cellulose which comprises treating cellulosic material with at least an equal amount of an acid which contains an acyl group and which is selected from the group which consists of the unsubstituted aliphatic monocarboxylic acids including the cycloparaffinic, the aromatic monocarboxylic acids, and the aralkyl monocarboxylic acids, and an anhydride substance selected from the groups which consists of acetic, propionic and butyric anhydrides, their halogen-substituted derivatives and their methoxy-substituted derivatives, the anhydride substance impelling the esterification of said cellulosic material by acyl groups from said acid, said acid containing more carbon atoms than the acid corresponding to said selected anhydride substance.

5. The process of making organic esters of cellulose containing higher fatty acid groups, which comprises treating cellulosic material with at least one acid selected from the group of lauric, myristic, palmitic and stearic acids, the amount of acid being greater than the amount of said cellulose, and an anhydride selected from the group of acetic anhydride and its mono, di and tri chlor and brom and methoxy substituted anhydrides, said anhydride impelling the esterification of said cellulosic material by acyl groups from said selected acid.

6. The process of making mixed organic esters of cellulose which comprises treating cellulosic material to the co-action of at least an equal amount of an acid which contains an acyl group and which is selected from the group which consists of the unsubstituted aliphatic monocarboxylic acids including the cycloparaffinic, the aromatic monocarboxylic acids, and the aralkyl monocarboxylic acids, and a lower fatty acid anhydride containing less than 10 carbon atoms which esterifies the cellulosic material with its own acyl groups and impels esterification by acyl groups from said selected acid, the acid corresponding to said anhydride containing less carbon atoms than the said selected acid.

7. The process of making mixed fatty acid esters of cellulose which comprises treating cellulosic material to the co-action of at least an equal amount of a fatty acid free from sulfur-containing groups having more than two carbon atoms, and a lower fatty acid anhydride containing less than 10 carbon atoms which esterifies the cellulosic material with its own acyl groups and impels esterification by acyl groups from said fatty acid, the acid corresponding to said anhydride containing less carbon atoms than said first-named fatty acid.

8. The process of making mixed fatty acid esters of cellulose which comprises treating cellulosic material to the co-action of at least an equal amount of an acid selected from the group of lauric, palmitic, and stearic acids, and a lower fatty acid anhydride containing less than 10 carbon atoms which esterifies cellulose with its own acyl groups and impels esterification by acyl groups from said selected acid.

9. The process of making mixed organic esters of cellulose which comprises treating cellulosic material to the co-action of at least an equal amount of an acid containing an acyl group having more than 2 carbon atoms and selected from the group which consists of the unsubstituted aliphatic monocarboxylic acids including the cycloparaffinic, the aromatic monocarboxylic acids, and the aralkyl monocarboxylic acids, and acetic anhydride which esterifies the cellulose with acetyl groups and impels esterification by acyl groups from said selected acid.

10. The process of making mixed fatty acid esters of cellulose which comprises treating cellulose with at least an equal amount of a mixture of a fatty acid free from sulfur-containing groups having more than 2 carbon atoms and acetic anhydride until said mixed ester is produced.

11. The process of making mixed fatty acid esters of cellulose which comprises treating cellulose to the co-action of a mixture of acetic anhydride and at least an equal amount of an acid selected from the group of lauric, myristic, palmitic and stearic acids.

12. The process of making mixed organic esters of cellulose which comprises treating cellulosic material in an esterifying bath containing at least an equal amount of an acid which contains an acyl group and which is selected from the group which consists of the unsubstituted aliphatic monocarboxylic acids including the cycloparaffinic, the aromatic monocarboxylic acids, and the aralkyl monocarboxylic acids, and a lower fatty acid anhydride containing less than 10 carbon atoms which impels the esterification of said cellulosic material by acyl groups from said acid, the acid corresponding to said anhydride containing less carbon atoms than said selected acid, and a common acid solvent of said selected acid, said anhydride, and the said mixed organic esters produced thereby.

13. The process of making mixed fatty acid esters of cellulose which comprises treating cellulosic material in an esterifying bath containing a fatty acid having more than 2 carbon atoms, a lower fatty acid anhydride containing less than 10 carbon atoms, and a halogen-substituted acetic acid as a common solvent of said first-named fatty acid, said anhydride and said mixed fatty acid ester produced thereby.

14. The process of making a mixed organic acid ester of cellulose which comprises treating cellulose in a bath containing more than 2% of an acid selected from the group of lauric, myristic, palmitic and stearic acids, a lower fatty acid anhydride containing less than 10 carbon atoms, which esterifies the cellulose with its own acyl groups and impels esterification by acyl groups from said selected acid, and sufficient monochloracetic acid to dissolve the other ingredients of the bath and the products formed therein by the esterification.

15. The process of making mixed organic acid esters of cellulose which comprises treating cellulosic material to the co-action of at least an equal amount of an acid which contains an acyl group and which is selected from the group which consists of the unsubstituted aliphatic monocarboxylic acids including the cycloparaffinic, the aromatic monocarboxylic acids, and the aralkyl monocarboxylic acids, a catalyst and a lower fatty acid anhydride containing less than 10 carbon atoms, which esterifies the cellulose with its own acyl groups and impels esterification by the acyl groups from said selected acid, the acid corresponding to said anhydride containing less carbon atoms than said selected acid.

16. The process of making mixed fatty acid esters of cellulose which comprises treating cellulosic material to an esterifying bath containing a fatty acid having more than two carbon atoms, a lower fatty acid anhydride containing less than 10 carbon atoms which esterifies the cellulose with its own acyl groups and impels esterification by acyl groups from said first-named acid, and sufficient halogenated acetic acid to dissolve the hereinabove named ingredients of said bath and the products formed by the reaction, said first-named fatty acid contained more carbon atoms than the acid corresponding to said anhydride, and the reaction being carried on at a temperature above the melting point of said bath, but below the temperature at which the cellulosic material, or the ester formed thereby are injured.

17. The process of making mixed fatty acid esters of cellulose which comprises treating cellulose in an esterifying bath comprising a mixture of an acid selected from the group of lauric, myristic, palmitic and stearic acids, acetic anhydride, and sufficient monochlor acetic acid to dissolve the other ingredients of the bath and the products of the reaction, the latter being conducted above the melting point of the bath but below 170° C.

18. The process of making mixed organic esters of cellulose which comprises treating cellulosic material to the co-action of an acid which contains an acyl group and which is selected from the group which consists of the unsubstituted aliphatic monocarboxylic acids including the cycloparaffinic, the aromatic monocarboxylic acids, and the aralkyl monocarboxylic acids, and a lower fatty acid anhydride containing less than 10 carbon atoms which esterifies the cellulose with its acyl groups and impels esterification by acyl groups from said selected acid, the weight of the selected acid being at least as great as the weight of said anhydride, and the acid corresponding to said anhydride being of lower molecular weight than said selected acid.

19. The process of making mixed fatty acid esters of cellulose which are soluble in acetone, which comprises treating cellulosic material in an esterifying bath containing approximately equal parts by weight of an acid selected from the group consisting of lauric, myristic, palmitic and stearic acids, and acetic anhydride, said bath containing sufficient monochloracetic acid to dissolve the other ingredients of the bath at 60 to 65° C., the reaction being conducted at said temperature range, until said acetone soluble ester is produced.

20. The process of making mixed organic esters of cellulose which comprises treating cellulosic material to the co-action of at least an equal amount of an acid which contains an acyl group and which is selected from the group which consists of the unsubstituted aliphatic monocarboxylic acids including the cycloparaffinic, the aromatic monocarboxylic acids, and the aralkyl monocarboxylic acids, and a lower fatty acid anhydride containing less than 10 carbon atoms which esterifies the cellulose with its own acyl groups and impels esterification by acyl groups from said selected acid, the acid corresponding to said anhydride containing less carbon atoms than said selected acid, the mixed organic acid thus produced being isolated and purified by means of a non-solvent volatile, neutral, organic liquid.

21. The process of making fatty acid esters of cellulose which comprises treating cellulose in a bath containing a fatty acid having more than 8 carbon atoms, acetic anhydride, and sufficient monochloracetic acid to render the bath liquid at a temperature of approximately 60° to 65° C., the mixed fatty acid ester being isolated from the bath by precipitation in methyl alcohol and washing with warm methyl alcohol.

22. The process of making organic esters of cellulose which comprises treating cellulosic material with an unsubstituted aliphatic mono carboxylic acid, the amount of said acid being at least as great as the cellulosic material, and an organic anhydride substance which impels the esterification of said cellulosic material by acyl groups from said acid, said acid containing more carbon atoms than the acid corresponding to said organic anhydride substance.

23. The process of making organic esters of cellulose which comprises treating cellulosic material with at least an equal amount of an acid selected from the group which consists of propionic, butyric, lauric, myristic, palmitic and stearic acids, and an organic anhydride substance which impels the esterification of the cellulosic material by acyl groups from said acid, the acid containing more carbon atoms than the acid corresponding to the organic anhydride substance.

24. The process of making organic esters of cellulose which comprises treating cellulosic material with at least an equal amount of an acid which contains an acyl group and which is selected from the group which consists of the unsubstituted aliphatic monocarboxylic acids including the cycloparaffinic, the aromatic monocarboxylic acids and the aralkyl monocarboxylic acids, and an anhydride substance selected from the group consisting of acetic, propionic, and butyric anhydrides, their halogen substituted derivatives and their alkoxy substituted derivatives, the anhydride substance impelling the esterification of the cellulosic material by acyl groups from said acid, the acid containing more carbon atoms than the acid corresponding to the selected anhydride substance.

25. The process of making organic esters of cellulose which comprises treating cellulosic material with at least an equal amount of an acid selected from the group which consists of propionic, butyric, lauric, myristic, palmitic and stearic acids, and an anhydride substance selected from the group which consists of acetic anhydride and its mono, di and tri chlor and brom and alkoxy substituted anhydrides, said anhydride impelling the esterification of the cellulosic material by acyl groups from the selected acid.

26. The process of making organic esters of cellulose which comprises treating cellulosic material with at least an equal amount of an acid selected from the group which consists of propionic, butyric, lauric, myristic, palmitic and stearic acids, and a lower fatty acid anhydride containing less than 10 carbon atoms which esterifies the cellulosic material with its own acyl groups and impels esterification by acyl groups from said fatty acid, the acid corresponding to the anhydride containing less carbon atoms than the first named fatty acid.

27. The process of making organic esters of cellulose which comprises treating cellulosic material with at least an equal amount of an acid selected from the group which consists of propionic, butyric, lauric, myristic, palmitic and stearic acids, and acetic anhydride.

28. The process of making organic esters of cellulose which comprises treating cellulosic material with at least an equal amount of an acid selected from the group which consists of propionic, butyric, lauric, myristic, palmitic and stearic acids, and a lower fatty acid anhydride containing less than 10 carbon atoms which impels the esterification of said cellulosic material by acyl groups from said acid, and a common acid solvent of the selected acid, the anhydride and the organic ester produced thereby, the acid corresponding to said anhydride containing less carbon atoms than said selected acid.

29. The process of making organic esters of cellulose which comprises treating cellulosic material with at least an equal amount of an acid selected from the group which consists of propionic, butyric, lauric, myristic, palmitic and stearic acids, and acetic anhydride, and a common acid solvent of the selected acid, the anhydride and the mixed organic ester produced thereby.

30. The process of making organic esters of cellulose which comprises treating cellulosic material with at least an equal amount of an acid selected from the group which consists of propionic, butyric, lauric, myristic, palmitic and stearic acids, and an anhydride substance selected from the group which consists of acetic anhydride and its mono, di and tri-chlor and brom and alkoxy substituted anhydrides, and a common acid solvent of the selected acid, the anhydride and the organic ester produced thereby.

31. The process of making fatty acid esters of cellulose which comprises treating cellulose in a bath containing a fatty acid having more than 8 carbon atoms, acetic anhydride, and a common acid solvent of the selected acid, the anhydride and the mixed cellulosic ester produced thereby.

Signed at Rochester, New York this 23rd day of March, 1927.

HANS T. CLARKE.
CARL J. MALM.